Nov. 3, 1925.
P. P. HEMM ET AL
1,559,750
POULTRY POWDERING MACHINE
Filed June 5, 1924     2 Sheets-Sheet 1
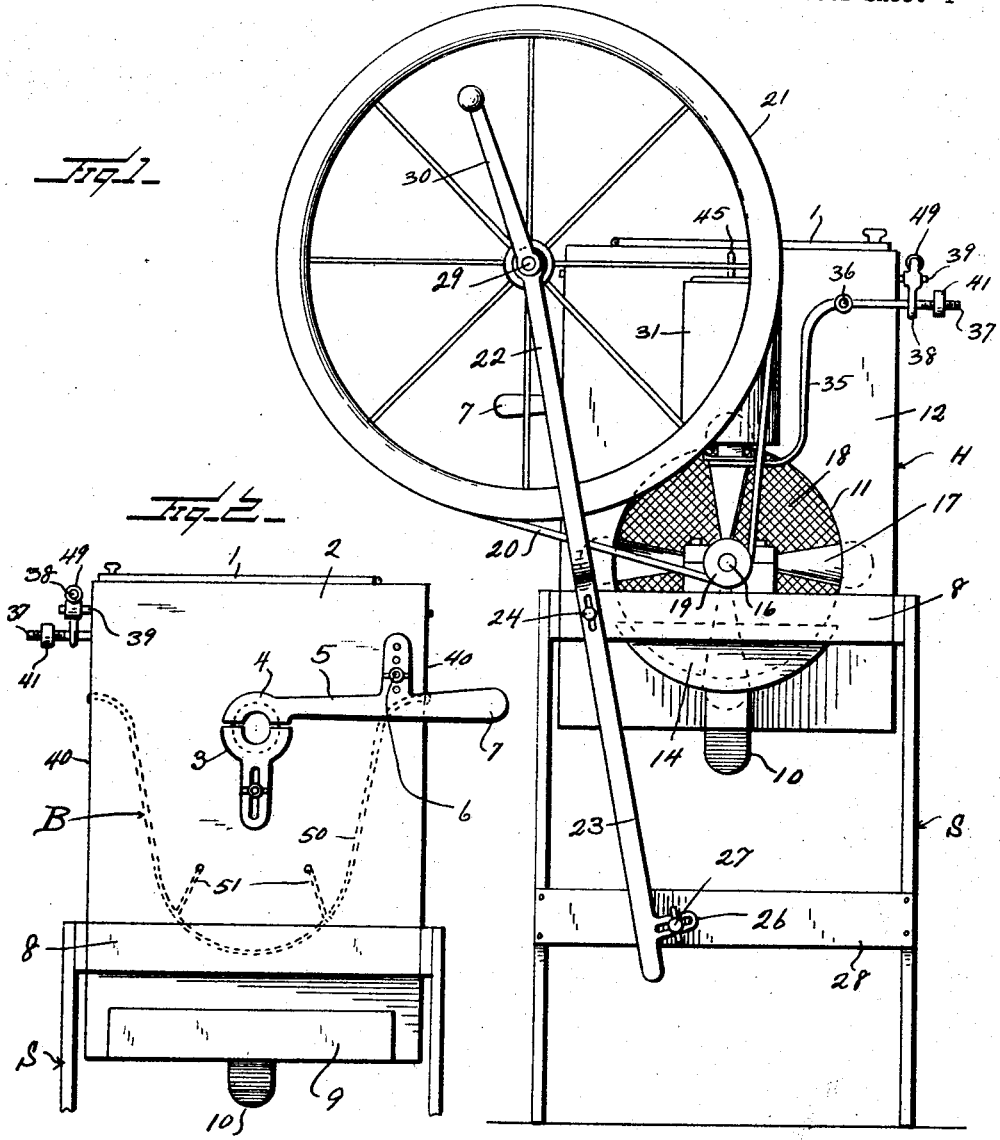
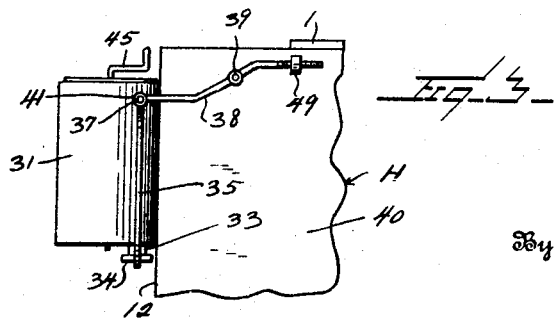
Inventors
P. P. Hemm
& W. E. Bernstein
By Watson E. Coleman
Attorney

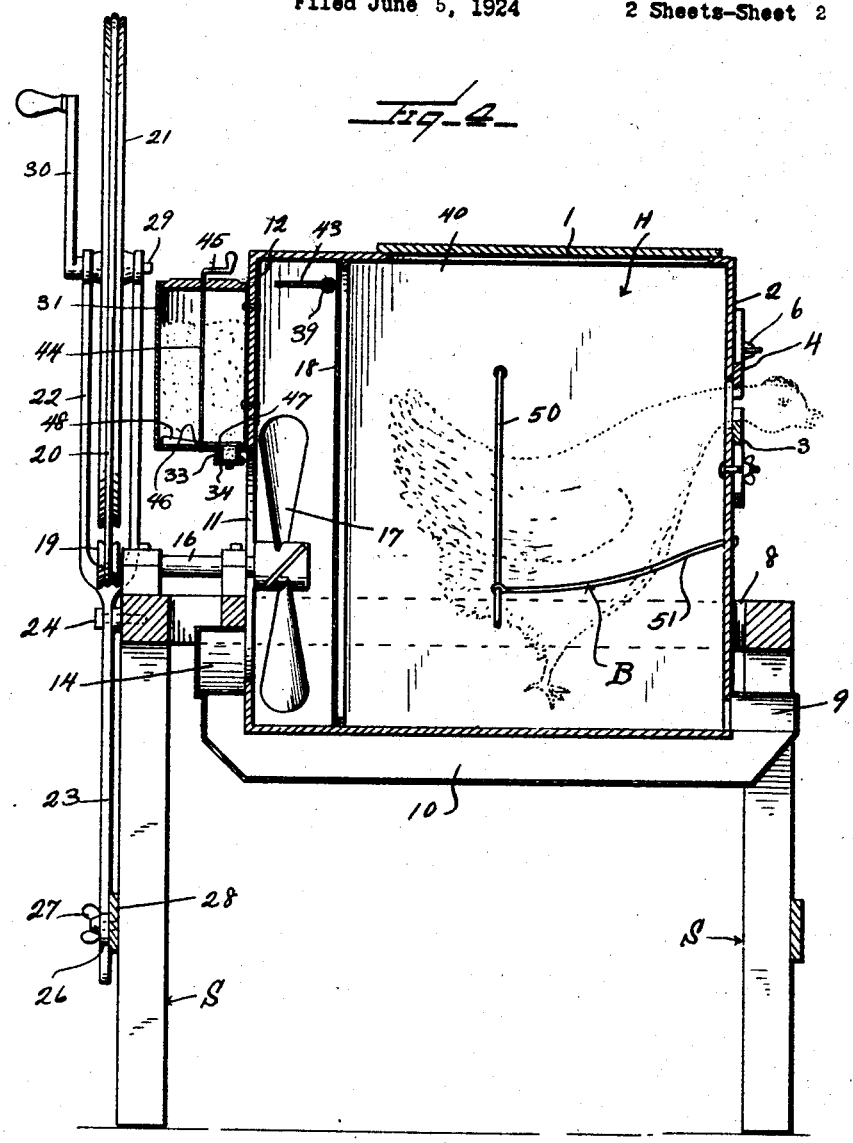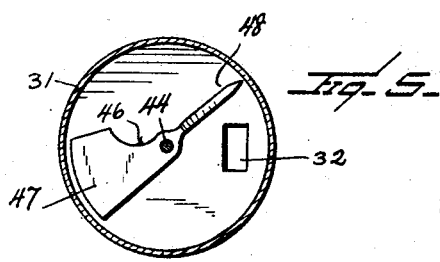

Patented Nov. 3, 1925.

1,559,750

UNITED STATES PATENT OFFICE.

PAUL P. HEMM AND WILLIE E. BERNSTEIN, OF DAVENPORT, NORTH DAKOTA.

POULTRY-POWDERING MACHINE.

Application filed June 5, 1924. Serial No. 718,083.

*To all whom it may concern:*

Be it known that we, PAUL P. HEMM and WILLIE E. BERNSTEIN, citizens of the United States, residing at Davenport, in the county of Cass and State of North Dakota, have invented certain new and useful Improvements in Poultry-Powdering Machines, of which the following is a specification, reference being had to the accompanying drawings.

This invention relates to poultry powdering machines and it is an object of the invention to provide a novel and improved device of this general character wherein a fowl may have effectively applied thereto anti-vermin powder.

Another object of the invention is to provide a novel and improved device of this general character comprising a housing in which a fowl to be treated is adapted to be arranged together with pneumatic means for applying a requisite powder to the fowl.

Furthermore it is an object of the invention to provide a novel and improved device of this general character comprising a container to hold a supply of powder together with means whereby such powder in a predetermined bulk is carried into a housing or the like to be applied to a fowl confined within such housing.

The invention consists in the details of construction and in the combination and arrangement of the several parts of our improved poultry powdering machine whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:—

Figure 1 is a side elevational view of a poultry powdering machine constructed in accordance with an embodiment of our invention;

Figure 2 is a fragmentary view in front elevation of the device as herein disclosed with certain of the parts omitted;

Figure 3 is a fragmentary view in rear elevation of the structure as herein disclosed;

Figure 4 is a vertical sectional view taken through the device as illustrated in Figure 1 with certain of the parts in elevation, an applied fowl being diagrammatically indicated by broken lines;

Figure 5 is a view partly in section and partly in top plan of the container as herein comprised.

As disclosed in the accompanying drawings, H denotes a housing of requisite dimensions and which is provided in its top wall with a relatively large opening normally closed by the door 1, such opening being of a size to readily permit a fowl being placed within the housing.

A side wall 2 of the housing is provided with a restricted opening through which the head of the fowl is adapted to be disposed so that the neck of the fowl may be held between the holding or locking members 3 and 4. One of said members as 3 is fixed to the wall 2 while the second member 4 is arranged at the outer end portion of an elongated member 5 pivotally supported, as at 6, for swinging movement so that the member 4 may be moved toward or from the member 3. The member 4 is also provided with a portion 7 extending beyond the housing H to provide means whereby the member 5 may be manually operated to effectively maintain the neck of the fowl locked or held between the jaws 3 and 4.

The housing H is maintained at a desired height through the medium of the supporting structure S comprising the upper frame 8 with which the housing H is directly engaged, said housing as herein disclosed being slightly below said frame 8.

The lower portion of the wall 2 is extended to provide a chamber 9 extending substantially entirely across said wall and in communication with the central portion of said chamber 9 at substantially its longitudinal center and from below is a return pipe 10 extending across the bottom of the housing H and leading to and discharging through the lower portion of a relatively large opening 11 provided in the wall 12 of the housing H opposed to the wall 2. The discharge end 14 of the pipe 10 constitutes a chordal chamber disposed across the lower portion of the opening 11 with the inner face of said chamber open.

Rotatably supported by the frame 8 of the supporting structure S and extending a slight distance inwardly of the housing H at substantially the axial center of the opening 11 is a shaft 16 and carried by the inserted end portion of said shaft 16 is a fan 17 which upon rotation draws or sucks air into the housing H through said opening 11 and forces the same through the housing H and through the pipe 10, the blast of air created by the fan being directed upon a fowl placed within the housing.

The fowl within the housing H is protected against coming in contact with the fan 17 by the perforated partition 18 intersecting the housing H and positioned in relatively close proximity to the fan 17, said partition being herein disclosed as comprising a screen fabric.

The outer end portion of the shaft 16 has fixed thereto a pulley 19 around which passes a belt 20 also disposed around a drive wheel 21. This drive wheel 21 is rotatably supported by a fork 22 having its shank 23 engaged, as at 24, with the structure S whereby the fork is supported for swinging movement. The shank 23 is provided with a lateral slotted extension 26 through which is disposed a clamping screw 27 engaged with a brace member 28 comprised in the supporting structure whereby the fork is held against swinging movement. The fork 22 is adapted, however, to be adjusted about its pivot in order to maintain the belt 20 sufficiently tight to assure the proper functioning thereof.

The drive wheel 21 is fixed to an axle 29 to which is secured an operating crank 30.

Arranged exteriorly of the housing H and secured to the wall 12 directly above the opening 11 is a container 31 to hold a supply of suitable anti-vermin or insecticide powder, the bottom wall of said container being provided with a discharge opening 32 defined by a depending flange 33 constituting a measuring cup. The lower end of this cup 33 is normally closed by a pan 34 carried by the lower end portion of a vertically disposed arm 35. The arm 35, as herein disclosed, is sigmoidal in form and has its upper end portion pivotally engaged, as at 36, with the wall 12. The pivoted end of this arm 35 is continued by an elongated rod 37 and overlying this rod 37 is an end portion of a rod 38 supported for swinging movement at a predetermined point intermediate its ends, as at 39, by a side wall 40 of the housing H so that upon swinging movement of said rod 38 in one direction the pan 34 will be moved in the opposite direction. The outer end portion of the arm 35 is provided with a weighted member 41 operating to maintain the pan 34 normally in its closed position. The mounting 39 for the arm 35 constitutes a rod extending across the upper portion of the housing H at a point between the wall 12 and the partition 18 and in relatively close proximity to said partition 18. The rod is rotatably supported by the side walls 40 of the housing H and fixed to said rod within the housing H and extending substantially entirely thereacross is a blade 43, said blade being substantially horizontally disposed when the pan 34 is in closed position.

Extending axially of the container 31 is a shaft 44 the upper end of which exteriorly of the container 31 being provided with a hand crank 45. The inserted end portion of the shaft 44 immediately adjacent to the bottom of the container 31 has fixed thereto a cross member 46 one end portion of which being enlarged to provide a valve 47 adapted to close the discharge opening 32 while the opposite end portion of said cross member carries an upstanding blade 48. With the pan 34 in closed position the shaft 44 is adapted to be rotated to move the valve 47 into open position and to permit the blade 48 to sufficiently agitate the powder within the container 31 to assure the requisite filling of the cup 33 after which the shaft 44 is operated to return the valve 47 to its closed position.

The end portion of the rod 38 remote from the arm 45 is provided with a poise 49 adapted to be so positioned to facilitate the upward swinging movement of the opposite end portion of the rod 37 when the blast of air created within the housing H by the fan 17 reaches a predetermined force or velocity.

After the fowl has been positioned within the housing H, the fan 17 is caused to operate and the resultant blast acting upon the blade 43 will move the same upwardly a distance to lift the rod 37 to an extent sufficient to permit the pan 34 to move into open position and the powder thereon will be drawn by suction from the fan into the housing H and effectively applied to the fowl. After the fowl has been subjected for a requisite time to the powdering or dusting operation the fan 17 is stopped whereupon the pan 34 will automatically return to its closed position.

The fowl when applied within the housing H is rested upon a saddle B, said saddle being so positioned as to maintain the feet of the fowl free of the bottom of the housing. As herein disclosed, the saddle B comprises a rod 50 having its end portions suitably secured to the side walls 40, said rod having its central portion downwardly offset and the intermediate portions of said rod 50 have secured thereto the rods 51 the opposite end portions of which being secured to the wall 2 of the housing H, said rods 51 being disposed on a suitable curvature and in such spaced relation as to provide a support for the body of the fowl, the legs of which depend between said rods 51.

From the foregoing description it is thought to be obvious that a poultry powdering machine constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

1. A machine of the class described comprising, in combination, a housing adapted to receive a fowl, said housing being provided with an opening, a container for insecticide positioned adjacent to said opening and provided with a discharge opening, a pan positioned to receive insecticide discharged through said opening of the container, means for creating a blast of air within the housing, and means under control of said air blast for moving the pan in a position to cause the blast to draw the insecticide from the pan into the housing.

2. A machine of the class described comprising, in combination, a housing adapted to receive a fowl, means for creating a blast of air within the housing, means for supporting a supply of insecticide to be drawn into the housing by such blast of air, and a return pipe for the air blast and surplus insecticide from one side of the housing to another.

3. A machine of the class described comprising, in combination, a housing provided with an opening, said housing being adapted to contain a fowl, a container for insecticide positioned adjacent to said opening and provided with a discharge opening, said opening being substantially defined by a flange to provide a measuring cup, a pan upon which said cup discharges, said pan normally closing the cup, means for creating an air blast within the housing, means operable under the influence of said air blast for moving the pan into a position with respect to the opening of the housing to permit insecticide to be drawn into the housing with the air blast.

4. A machine of the class described comprising a housing adapted to receive a fowl, a fan within the housing to create an air blast upon the fowl within the housing, said housing being provided with an opening, a pan adapted to contain a supply of insecticide, means for supporting said pan for movement relative to the opening, a rock arm for controlling such movement of the pan, and means under control of the air blast for moving said rock arm toward and away from the opening.

5. A machine of the class described comprising a housing adapted to receive a fowl, a fan within the housing to create an air blast upon the fowl within the housing, said housing being provided with an opening, a pan adapted to contain a supply of insecticide, means for supporting said pan for movement relative to the opening, a rock arm for controlling such movement of the pan, a rod disposed through the housing and to which the rock arm is secured, and a blade carried by the rock arm, the air blast created by the pan coacting with the blade to impart swinging movement to the rock arm toward and away from the opening.

6. A machine of the class described comprising, in combination, a housing provided with an opening, said housing being adapted to contain a fowl, a container for insecticide positioned adjacent to said opening and provided with a discharge opening, a pan upon which said opening discharges, said pan normally closing the opening, means for creating an air blast within the housing, means operable under the influence of said air blast for moving the pan into a position with respect to the opening of the housing to permit insecticide to be drawn into the housing with the air blast.

In testimony whereof we hereunto affix our signatures.

PAUL P. HEMM.
W. E. BERNSTEIN.